United States Patent
Jain et al.

(10) Patent No.: US 7,481,985 B2
(45) Date of Patent: *Jan. 27, 2009

(54) METHOD OF REMOVING IMPURITIES FROM A GAS

(75) Inventors: Ravi Jain, Bridgewater, NJ (US); YuDong Chen, Bridgewater, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/500,129

(22) Filed: Aug. 7, 2006

(65) Prior Publication Data

US 2007/0031309 A1 Feb. 8, 2007

Related U.S. Application Data

(60) Provisional application No. 60/706,328, filed on Aug. 8, 2005.

(51) Int. Cl.
*B01D 53/34* (2006.01)
*B01D 53/38* (2006.01)
*B01D 53/48* (2006.01)
*C01B 31/20* (2006.01)

(52) U.S. Cl. ............... 423/210; 423/220; 423/230; 423/231; 423/242.1; 423/244.01; 423/244.06; 423/244.07; 423/244.08; 423/244.09; 423/244.1; 423/244.11; 423/245.1; 423/437.1

(58) Field of Classification Search ............... 423/210, 423/220, 230, 231, 242.1, 244.01, 244.06, 423/244.07, 244.08, 244.09, 244.1, 245.1, 423/437.1, 244.11

See application file for complete search history.

(56) References Cited

U.S. PATENT DOCUMENTS

| | | | | |
|---|---|---|---|---|
| 2,594,268 A | * | 4/1952 | Geisel | 423/437.1 |
| 4,332,781 A | * | 6/1982 | Lieder et al. | 423/576.6 |
| 5,512,260 A | | 4/1996 | Klliany et al. | |
| 5,536,301 A | | 7/1996 | Lansbarkis et al. | |
| 5,674,463 A | * | 10/1997 | Dao et al. | 423/230 |
| 5,704,965 A | | 1/1998 | Tom et al. | |
| 5,858,068 A | * | 1/1999 | Lansbarkis et al. | 95/116 |
| 6,099,619 A | * | 8/2000 | Lansbarkis et al. | 95/118 |
| 6,402,813 B2 | | 6/2002 | Monereau et al. | |
| 6,441,264 B1 | | 8/2002 | LeMaire et al. | |
| 6,669,916 B2 | * | 12/2003 | Heim et al. | 423/245.1 |
| 6,797,036 B2 | | 9/2004 | Funke et al. | |
| 6,962,629 B2 | | 11/2005 | Johnson | |
| 7,135,604 B2 | | 11/2006 | Ding | |
| 2002/0150522 A1 | | 10/2002 | Heim et al. | |
| 2003/0033936 A1 | | 2/2003 | Funke et al. | |
| 2003/0198585 A1 | * | 10/2003 | Salma et al. | 423/242.6 |
| 2003/0200866 A1 | | 10/2003 | Weyrich et al. | |
| 2004/0052708 A1 | * | 3/2004 | Rao | 423/219 |

(Continued)

OTHER PUBLICATIONS

International Search Report, Jan. 22, 2008.

(Continued)

*Primary Examiner*—Timothy C Vanoy
(74) *Attorney, Agent, or Firm*—Joshua L. Cohen

(57) ABSTRACT

The present invention provides for a method and apparatus for purifying carbon dioxide. Sulfur species are efficiently and effectively removed from the carbon dioxide by a series of steps which include heater/heat exchange means, impurity adsorption means and cooling means.

35 Claims, 3 Drawing Sheets

U.S. PATENT DOCUMENTS

| | | |
|---|---|---|
| 2005/0019240 A1 | 1/2005 | Lu et al. |
| 2005/0098495 A1 | 5/2005 | Hughes |
| 2005/0265912 A1* | 12/2005 | Alvarez, Jr. et al. ......... 423/224 |
| 2007/0028764 A1 | 2/2007 | Wittrup et al. |
| 2007/0028766 A1 | 2/2007 | Jain |
| 2007/0028772 A1 | 2/2007 | Jain et al. |
| 2007/0028773 A1 | 2/2007 | Jain et al. |
| 2007/0031302 A1* | 2/2007 | Wittrup et al. .............. 422/168 |
| 2007/0031309 A1 | 2/2007 | Jain et al. |
| 2007/0031974 A1 | 2/2007 | Jain et al. |

OTHER PUBLICATIONS w/International Search Report, Sep. 26, 2007.

* cited by examiner

METHOD OF REMOVING IMPURITIES FROM A GAS

FIELD OF THE INVENTION

The present invention provides a method for removing impurities from a gas. In particular, this invention provides a method for removing sulfur species from carbon dioxide.

BACKGROUND OF THE INVENTION

Carbon dioxide is used in a number of industrial and domestic applications, many of which require the carbon dioxide to be free from various impurities. Unfortunately, carbon dioxide obtained from natural sources such as gas wells, chemical processes, fermentation processes or produced in industry, particularly carbon dioxide produced by the combustion of hydrocarbon products, often contains impurity levels of sulfur compounds such as carbonyl sulfide (COS) and hydrogen sulfide ($H_2S$). When the carbon dioxide is intended for use in an application that requires the carbon dioxide to be of high purity, such as in the manufacture and cleaning of foodstuffs and beverage carbonation, medical products and electronic devices, the sulfur compounds contained in the gas stream must be removed to very low levels prior to use. The level of impurity removal required varies according to the application of carbon dioxide. For example, for beverage application the total sulfur level in carbon dioxide ($CO_2$) ideally should be below 0.1 ppm. Removal to similar levels is required for electronic cleaning applications.

Various methods for removing sulfur compounds and hydrocarbon impurities from gases such as carbon dioxide are known. For example, U.S. Pat. No. 4,332,781, issued to Lieder et al., discloses the removal of COS and $H_2S$ from a gas stream by first removing the $H_2S$ from the hydrocarbon gas stream by contacting the gas stream with an aqueous solution of a regenerable oxidizing reactant, which may be a polyvalent metallic ion, such as iron, vanadium, copper, etc., to produce a COS-containing gas stream and an aqueous mixture containing sulfur and reduced reactant. The COS in the gas stream is subsequently hydrolyzed to $CO_2$ and $H_2S$ by contacting the gas stream with water and a suitable hydrolysis catalyst, such as nickel, platinum, palladium, etc., after which the $H_2S$ and, if desired, the $CO_2$ are removed. This step can be accomplished by the earlier described $H_2S$ removal step or by absorption. The above-described process involves the use of cumbersome and costly equipment and liquid-based systems which require considerable attention and may result in the introduction of undesirable compounds, such as water vapor, into the carbon dioxide product.

U.S. Pat. Nos. 5,858,068 and 6,099,619 describe the use of a silver exchanged faujasite and an MFI-type molecular sieve for the removal of sulfur, oxygen and other impurities from carbon dioxide intended for food-related use. U.S. Pat. No. 5,674,463 describes the use of hydrolysis and reaction with metal oxides such as ferric oxide for the removal of carbonyl sulfide and hydrogen sulfide impurities from carbon dioxide.

It is known to directly remove sulfur compounds, such as $H_2S$ from a gas stream by contacting the gas stream with metal oxides, such as copper oxide, zinc oxide or mixtures of these. It is also known to remove sulfur impurities such as COS by first hydrolyzing COS to $H_2S$ over a hydrolysis catalyst and then removing $H_2S$ by reaction with metal oxides. Removal of $H_2S$ by reaction with metal oxides can become expensive, since the catalyst is non-regenerable and expensive, when impurities such as COS and $H_2S$ are present in more than trace amounts. Lower cost materials for the removal of COS and $H_2S$ and other sulfur impurities such as mercaptans and dimethyl sulfide are desired to reduce $CO_2$ purification cost.

Since many end users of carbon dioxide require the carbon dioxide they use to be substantially free of sulfur compounds, and because natural sources of carbon dioxide and industrially manufactured carbon dioxide often contain sulfur compounds, economic and efficient methods for effecting substantially complete removal of sulfur compounds from carbon dioxide gas streams, without concomitantly introducing other impurities into the carbon dioxide, are continuously sought. The present invention provides a simple and efficient methods for achieving these objectives.

SUMMARY OF THE INVENTION

The present invention provides for a method of purifying a gas comprising the steps of heating an impure gas stream to above ambient temperature and feeding the impure gas stream into a sulfur removal unit; optionally further heating the gas from sulfur removal unit and feeding the gas to a reactor bed to remove impurities by oxidation; cooling the carbon dioxide stream exiting the reactor or the sulfur removal bed; optionally removing the moisture and other impurities; and optionally feeding the purified gas to a process requiring purified gas.

In an embodiment, the gas comprises carbon dioxide, and the impurities comprise sulfur species.

In another embodiment of the present invention, there is provided a method of removing sulfur species from a carbon dioxide gas stream in a carbon dioxide production plant comprising the steps of heating a low pressure impure carbon dioxide stream to above ambient temperature and feeding it into a sulfur removal unit; optionally further heating the carbon dioxide from sulfur removal unit and feeding said carbon dioxide to a reactor bed to remove impurities by oxidation; cooling the carbon dioxide stream exiting the reactor or the sulfur removal bed; compressing the resulting carbon dioxide and further purifying/liquefying it; and optionally feeding the purified carbon dioxide to a process requiring purified carbon dioxide.

In yet another embodiment of the present invention, there is provided a method of removing sulfur species from a carbon dioxide gas stream in a carbon dioxide production plant comprising the steps of compressing the carbon dioxide stream from a carbon dioxide source; optionally further heating the carbon dioxide exiting the last compressor stage, optionally adding oxygen to it and feeding it into a sulfur removal unit; optionally further heating the carbon dioxide from sulfur removal unit and feeding said carbon dioxide to a reactor bed to remove impurities by oxidation; cooling the carbon dioxide stream exiting the reactor or the sulfur removal bed; and further purifying the resulting carbon dioxide and optionally feeding the purified carbon dioxide to a process requiring purified carbon dioxide.

BRIEF DESCRIPTION OF THE DRAWINGS

While the specification concludes with claims distinctly pointing the subject matter that Applicants regard as their invention, the invention would be better understood when taken in connection with the accompanying drawings in which:

DETAILED DESCRIPTION OF THE INVENTION

Figure 1:
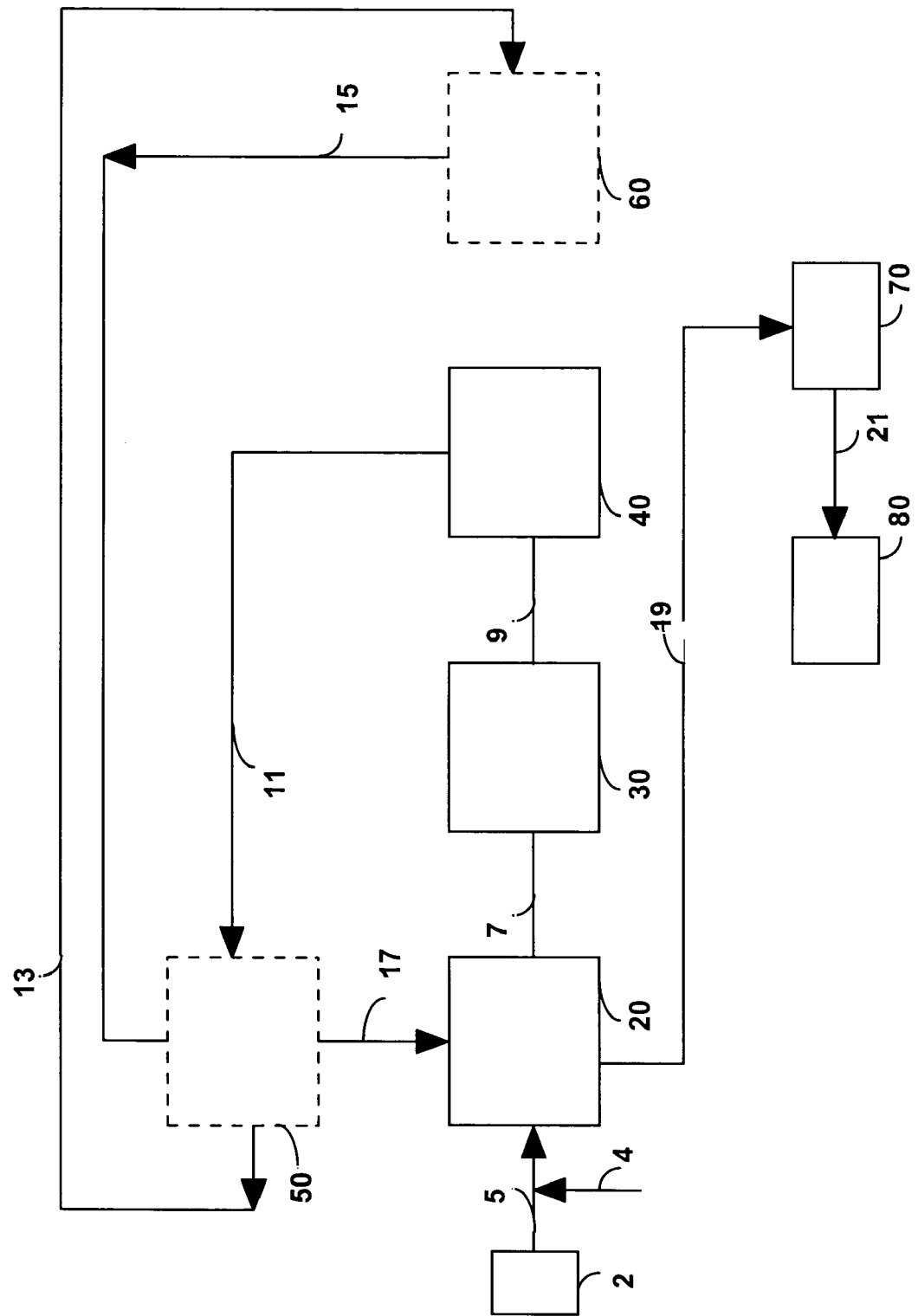
FIG. 1 is a schematic description of the overall process for removing sulfur impurities from carbon dioxide.

The carbon dioxide that is typically produced for industrial operations has a number of impurities present in it. These impurities will often be a concern for many uses of the carbon dioxide, but in the production of products intended for human consumption such as carbonated beverages, and electronic manufacturing the purity of the carbon dioxide is paramount and can influence the taste, quality, and legal compliance of the finished product.

The impure carbon dioxide which can be obtained from any available source of carbon dioxide will typically contain as impurities sulfur compounds such as carbonyl sulfide, hydrogen sulfide, dimethyl sulfide, sulfur dioxide and mercaptans. This invention describes novel and low cost methods for the removal of various sulfur impurities. The impurity removal can be used in various ways depending on whether the carbon dioxide is purified at a production plant, or at the point of use. Various point of use applications of carbon dioxide include a beverage filling plant, a food freezing plant, an electronics manufacturing plant and a fountain type carbon dioxide dispensing location.

For the purposes of this invention at least some of the sulfur impurities such as hydrogen sulfide and carbonyl sulfide are removed at an elevated temperature, a temperature of 50° to 150° C. In a point of use application this temperature can be obtained by using a combination of heater and heat exchange means. In a production plant this temperature may be obtained during the compression of feed carbon dioxide after the final compression stage but before the aftercooler. In a production plant, for the feed containing high levels of sulfur compounds (>10 to several hundred ppms), it is highly desirable to remove sulfur compounds prior to compression and the temperature for sulfur removal is obtained by heater and heat exchanger means. The impure carbon dioxide gas stream having been raised to the proper temperature is directed to a sulfur reactor bed. This bed is typically a vessel that will contain certain catalyst and adsorbent materials which will either react with or adsorb the sulfur compounds.

Preferably the catalyst materials are those that will cause the $H_2S$ and COS to convert to elemental sulfur which is retained on the purification media or react with the sulfur impurities to form metal oxides. The sulfur impurities such as mercaptans can simply be adsorbed on the purification media. Some of the materials may require oxygen to convert sulfur compounds such as hydrogen sulfide to sulfur and both oxygen and water to convert carbonyl sulfide to hydrogen sulfide and then to sulfur. The sulfur purification materials according to this invention include carbonates and hydroxides such as sodium and potassium hydroxides or carbonates on activated carbon; metal oxides such as copper, zinc, chromium or iron oxide either alone or supported on a microporous adsorbent such as activated alumina, activated carbon or silica gel. Other materials such as a CuY zeolite are effective for the removal of carbonyl sulfide, dimethyl sulfide and sulfur dioxide impurities through reaction. Mercaptans are typically removed by adsorption on support such as activated carbon. Supported hydroxides and carbonates are preferred materials because of high capacities and significantly lower cost compared to oxide type materials. These materials typically cost less than $2.0-4.0 per kg compared to $10-20 per kg for metal oxides such as zinc, zinc/copper oxide.

For materials containing hydroxide and carbonates on activated carbon or activated alumina hydrogen sulfide reacts with oxygen to form elemental sulfur which is then retained on activated carbon. For these materials carbonyl sulfide reacts with water in the feed to form hydrogen sulfide which is then converted to sulfur in presence of oxygen and retained on activated carbon. Use of elevated temperatures for sulfur removal significantly improves removal capacity for both hydrogen sulfide and carbonyl sulfide compared to operation near ambient temperatures. Inventors have unexpected discovered that these materials have little carbonyl sulfide removal capability and reasonable hydrogen sulfide capacity at ambient temperature. However, at elevated temperatures carbonyl sulfide removal capacity increases by a factor of 10-50 and the sulfur dioxide removal capacity increases by over a factor of 2. Impurities such as mercaptans are also removed by these materials. For materials containing metal oxides and zeolites the sulfur impurities are removed by reaction to form metal sulfides. Combinations of oxides/zeolites and hydroxide/carbonate materials can be used for optimum removal of sulfur impurities. While most sulfur impurities are removed by these materials, some of other sulfur impurities such as dimethyl sulfide are not removed to a significant extent and may need to be removed by other means.

The stream exiting the sulfur removal bed can optionally be further heated and sent to a catalytic reactor for oxidation of various hydrocarbon impurities. The stream exiting the reactor beds or the sulfur removal beds is cooled to close to ambient temperatures in heat exchange means. FIG. 1 is an overview of the carbon dioxide purification process according to this invention. Depending on impurities in the feed some components of this process can be eliminated. Carbon dioxide containing impurities is directed from source 2 and line 5 to a first heat exchanger 20. Oxygen is added to this stream via line 4 for use in the sulfur removal bed and in the catalytic reactor. The first heat exchanger 20 will raise the temperature of the impure carbon dioxide from about ambient to between 40 and 120° C. The heated impure carbon dioxide leaves the first heat exchanger through line 7 to a heater 30 where its temperature is further increased to between 50 and 150° C. For certain situations the heat exchanger 20 may be eliminated and only heater 30 may be used to increase the temperature of the stream. The impure carbon dioxide leaves the heater through line 9 and enters the sulfur removal bed 40. The sulfur removal bed contains various materials such as supported carbonates, hydroxides and oxides for the removal of various sulfur impurities such as hydrogen sulfide, COS and mercaptans.

The impure carbon dioxide which is now essentially free of most sulfur impurities is optionally directed through line 11 to a second heat exchanger 50 where its temperature is raised to over 150° C. The impure carbon dioxide exits the second heat exchanger through line 13 and is further heated to a temperature between 150 and 450° C. in a heater not shown. The heated carbon dioxide enters an optional catalyst reactor 60 containing a pelleted or a monolith catalyst. Various impurities such as benzene and aldehydes in the feed react with oxygen in the catalytic reactor and are converted to carbon dioxide and water. Some of the remaining sulfur impurities in the feed may be converted to sulfur dioxide in this reactor.

The now essentially purified carbon dioxide gas stream leaves the catalytic reactor bed through line 15 where it returns to the second heat exchanger 50.

The purified carbon dioxide gas stream leaves the second heat exchanger through line 17 and is directed into the first heat exchanger 20 where its temperature is reduced to less than 40° C. The cooled purified carbon dioxide gas steam can be sent to downstream processing equipment 70 through line 19 where it is further purified and optionally liquefied. It can also be sent to a $CO_2$ use process, unit 80, via line 21.

Figure 2:
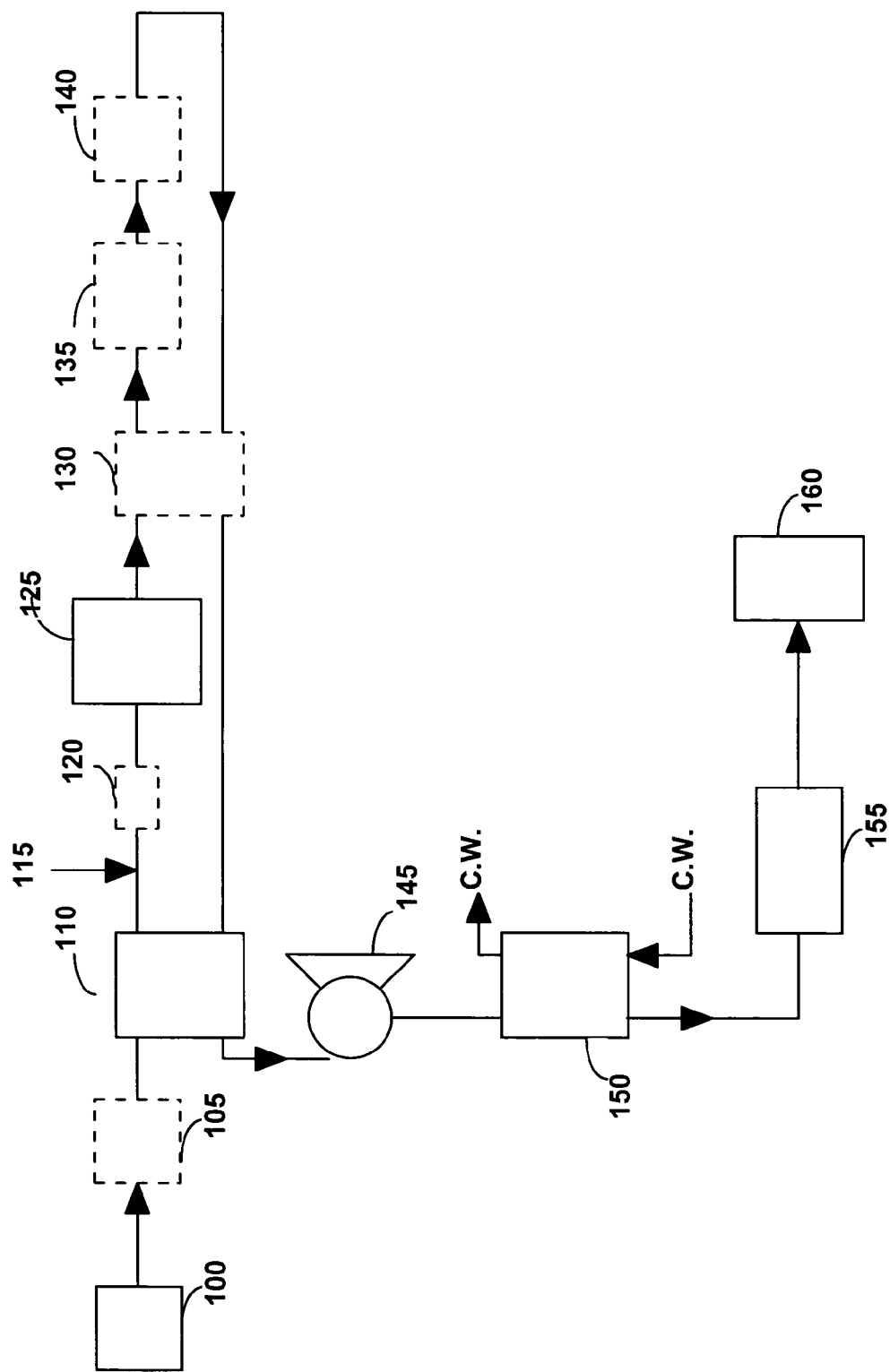
FIG. 2 is a schematic description of purifying carbon dioxide in a carbon dioxide production plant.
Figure 3:
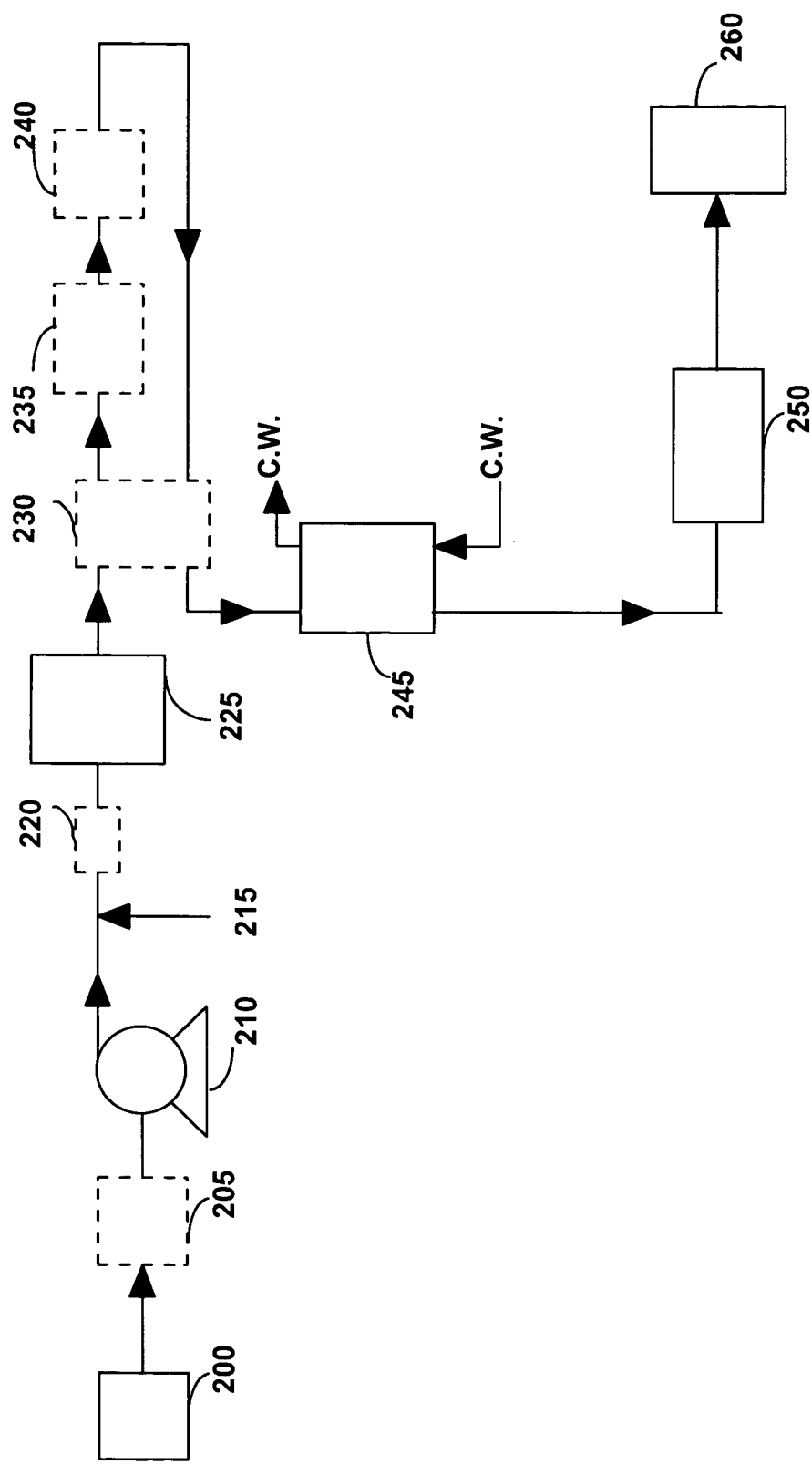
FIG. 3 is another schematic description of purifying carbon dioxide in a carbon dioxide production plant.

Purification of carbon dioxide in a carbon dioxide production plant is shown in FIGS. 2 and 3.

In FIG. 2, carbon dioxide from a source 100 is sent to an optional purification unit 105. This unit may consist of one or more purification processes chosen from adsorption, water wash column, electrostatic precipitator or a filtration unit. The carbon dioxide exiting unit 105 is sent to a heat exchanger 110 to raise its temperature to between 40 and 120° C. and oxygen is added to this stream at line 115. The stream exiting unit 110 is sent to an optional heater unit 120 to further increase its temperature to around between 50 and 150° C. and is then sent to the sulfur removal unit 125 where sulfur impurities such as hydrogen sulfide, carbonyl sulfide, and mercaptans are removed by reaction with metal oxides, hydroxides or carbonates, or copper exchanged zeolites. Some of the reaction products such as sulfur may also be adsorbed on supports such as activated carbons and activated alumina.

The stream exiting the sulfur removal unit 125 is further heated in an optional heat exchanger 130 and optional heater 135 and enters the optional catalytic reactor 140. The catalytic reactor contains supported noble metal catalysts such as palladium or platinum in pelleted or monolith forms. The catalytic reactor operates at a temperature between 150 and 450° C. depending on the impurities in the feed stream. The hydrocarbon impurities are oxidized to water and carbon dioxide in this reactor. The stream exiting reactor 140 is cooled in heat exchanger 130 and heat exchanger 110. If reactor 140 is not used stream exiting the sulfur bed 125 is cooled in heat exchanger 110. The stream exiting heat exchanger 110 is compressed in a compressor 145 to pressures between 10 and 20 bara and is cooled in an aftercooler 150 to a temperature close to ambient. The cooled, purified carbon dioxide gas steam can optionally be sent to downstream processing equipment 155 where it is further purified and optionally liquefied. It can also be sent to a $CO_2$ use process, unit 160.

The embodiment in FIG. 2 is particularly advantageous for feeds containing high levels of sulfurs, from 10 ppm to several hundred ppms. If this feed was sent directly to compressor 145, expensive materials of construction such as stainless steel may be needed to minimize the corrosion in the compressor. However, efficient high temperature removal of sulfurs in unit 125 obviates this need and a compressor made of carbon steel can be used, reducing the capital cost for the compressor by a factor 2 to 3.

In FIG. 3, carbon dioxide from source 200 is sent to an optional purification unit 205. This unit may consist of one or more purification processes chosen from adsorption, water wash column, electrostatic precipitator or a filtration unit. The carbon dioxide exiting unit 205 is sent to a compressor 210 to raise its pressure to between 10 and 20 bara and oxygen is added to the compressed stream at line 215. The stream exiting the final compression stage will be at a temperature between 70° and 95° C. and is sent to an optional heater unit 220 to further increase its temperature to between 80 and 150° C. and is then sent to the sulfur removal unit 225 where sulfur impurities such as hydrogen sulfide, carbonyl sulfide, and mercaptans are removed by reaction with metal oxides, hydroxides or carbonates, or copper exchanged zeolites. Some of the reaction products such as sulfur may also be adsorbed on supports such as activated carbons and activated alumina.

The stream exiting the optional sulfur removal unit 225 is further heated in an optional heat exchanger 230 and optional heater 235 and enters the optional catalytic reactor 240. The catalytic reactor contains supported noble metal catalysts such as palladium or platinum in pelleted or monolith forms. The catalytic reactor operates at a temperature between 150 and 450° C. depending on the impurities in the feed stream. The hydrocarbon impurities are oxidized to water and carbon dioxide in this reactor. The stream exiting reactor 240 is cooled in heat exchanger 230 and is further cooled in an aftercooler 245 to a temperature close to ambient. The cooled, purified carbon dioxide gas steam can optionally be sent to downstream processing equipment 250 where it is further purified and optionally liquefied. It can also be sent to a $CO_2$ use process, unit 260.

EXAMPLE 1

A feed containing 9 ppm COS in carbon dioxide at a pressure of 14.6 bara and a temperature of 100° C. was passed through a bed containing 0.12 kgs of activated carbon containing 20 wt % potassium carbonate at a flow rate of 19.8 std liters/min. About 100 ppm of oxygen was added to the feed. An equilibrium COS capacity of 5.15 wt % was obtained at this temperature. The same feed was passed through the same bed at a temperature of 25° C. and an equilibrium COS capacity of <0.1 wt % was obtained.

EXAMPLE 2

The same feed now containing 50 ppm $H_2S$ in carbon dioxide at a pressure of 14.6 bara and a temperature of 100° C. was passed through a bed containing 0.154 kgs of activated carbon containing 20 wt % potassium carbonate at a flow rate of 15.6 std liters per min. About 100 ppm oxygen was added to the feed. An equilibrium $H_2S$ capacity of 18 wt % was obtained. The same feed was passed through the same bed at a temperature of 25° C. and an equilibrium $H_2S$ capacity of around 10 wt % was obtained.

Both these experiments indicate that a significant improvement in the removal capacity for COS and $H_2S$ is possible by operating at an elevated temperature.

EXAMPLE 3

Testing was performed using a purification skid containing 17.1 kgs of activated carbon impregnated with 20 wt % potassium carbonate. Carbon dioxide at a pressure of 17 bara, at a temperature of 85° C., and at a flow rate 109.7 std m³/hr was passed through the bed. The feed contained 25-100 ppb of ethyl and methyl mercaptans. No mercaptans were seen at the bed outlet during a test period of about one week.

While the present invention has been described with reference to several embodiments and examples, numerous changes, additions and omissions, as will occur to those skilled in the art, may be made without departing from the spirit and scope of the present invention.

What is claimed is:

1. A method of removing a sulfur species selected from the group consisting of $H_2S$, COS, dimethyl sulfide and mercaptans from a gas stream comprising:
    a) heating a gas stream to above ambient temperature;
    b) passing the heated gas stream to an impurity removal unit, the impurity removal unit comprising a sulfur reactor bed;
    c) cooling the heated gas stream from the impurity removal unit to form a purified carbon dioxide stream; and
    d) removing moisture and other impurities from the purified carbon dioxide stream.

2. The method of claim 1 further comprising adding oxygen to the gas stream prior to heating the gas stream to ambient temperature.

3. The method of claim 1 further comprising additional heating of the heated gas stream from the impurity removal unit and passing the further heated gas stream to a reactor bed to remove impurities by oxidation.

4. The method of claim 3 further comprising cooling the further heated gas stream from the reactor bed.

5. The method of claim 1 wherein the gas stream is heated to a temperature of about 50° C. to about 150° C.

6. The method of claim 1 wherein said sulfur reactor bed contains a catalyst that reacts with the $H_2S$ and the COS.

7. The method of claim 6 wherein said catalyst is selected from the group consisting of carbonates and hydroxides, carbonates on activated carbon or activated alumina, metal oxides, metal oxides supported on a microporous adsorbent, and CuY zeolite.

8. The method of claim 1 wherein the gas stream is a low pressure impure carbon dioxide gas stream.

9. The method of claim 1 wherein the gas stream is from a low pressure impure carbon dioxide source.

10. A method of removing sulfur species from an impure low pressure carbon dioxide gas stream in a carbon dioxide production plant comprising:
   a) heating a carbon dioxide gas stream to above ambient temperature;
   b) passing the heated carbon dioxide gas stream to a sulfur removal unit;
   c) cooling the heated carbon dioxide gas stream from the sulfur removal unit to form a purified carbon dioxide gas stream; and
   d) compressing the purified carbon dioxide gas stream; and
   e) removing moisture and other impurities from the purified carbon dioxide gas stream.

11. The method of claim 10 further comprising adding oxygen to the carbon dioxide gas stream prior to heating the carbon dioxide gas stream to above ambient temperature.

12. The method of claim 10 further comprising additional heating of the heated carbon dioxide gas stream from the sulfur removal unit and passing the further heated carbon dioxide gas stream to a reactor bed to remove impurities by oxidation.

13. The method of claim 12 further comprising cooling the further heated carbon dioxide stream from the reactor bed.

14. The method of claim 10 further comprising purifying the compressed carbon dioxide gas stream.

15. The method of claim 10 further comprising passing the purified carbon dioxide gas stream to a reaction process.

16. The method of claim 10 wherein said sulfur species is selected from the group consisting essentially of $H_2S$, COS, dimethyl sulfide and mercaptans.

17. The method of claim 10 wherein said carbon dioxide gas stream is heated to a temperature of about 50° C. to about 150° C.

18. The method of claim 10 wherein said sulfur removal unit comprises a sulfur reactor bed.

19. The method of claim 18 wherein said sulfur reactor bed contains a catalyst that reacts with $H_2S$ and COS.

20. The method of claim 19 wherein said catalyst is selected from the group consisting of carbonates and hydroxides, carbonates on activated carbon or activated alumina, metal oxides, metal oxides supported on a microporous adsorbent, and CuY zeolite.

21. A method of removing sulfur species from an impure carbon dioxide gas stream in a carbon dioxide production plant comprising:
   a) compressing the impure carbon dioxide gas stream;
   b) passing the compressed impure carbon dioxide gas stream to a sulfur removal unit;
   c) cooling the heated carbon dioxide gas stream from the sulfur removal unit to form a purified carbon dioxide gas stream; and
   d) compressing the purified carbon dioxide gas stream.

22. The method of claim 21 further comprising adding oxygen to the compressed impure carbon dioxide gas stream prior to passing the compressed impure carbon dioxide gas stream to the sulfur removal unit.

23. The method of claim 21 further comprising heating of the compressed impure carbon dioxide gas stream prior to passing the compressed impure carbon dioxide gas stream to the sulfur removal unit.

24. The method of claim 21 further comprising additional heating of the heated compressed carbon dioxide gas stream from the sulfur removal unit and passing the further heated compressed carbon dioxide gas stream to a reactor bed to remove impurities by oxidation.

25. The method of claim 21 further comprising removing moisture and other impurities.

26. The method of claim 21 further comprising purifying the compressed carbon dioxide gas stream.

27. The method of claim 21 further comprising passing the purified carbon dioxide gas stream to a reaction process.

28. The method of claim 21 wherein said sulfur species is selected from the group consisting essentially of $H_2S$, COS, dimethyl sulfide and mercaptans.

29. The method of claim 21 wherein said carbon dioxide gas stream is heated to a temperature of about 50° C. to about 150° C.

30. The method of claim 21 wherein said sulfur removal unit comprises a sulfur reactor bed.

31. The method of claim 30 wherein said sulfur reactor bed contains a catalyst that reacts with $H_2S$ and COS.

32. The method of claim 31 wherein said catalyst is selected from the group consisting of carbonates and hydroxides, carbonates on activated carbon or activated alumina, metal oxides, metal oxides supported on a microporous adsorbent, and CuY zeolite.

33. A method of removing impurities from a gas stream comprising:
   a) heating a gas stream to above ambient temperature;
   b) passing the heated gas stream to a sulfur removal unit;
   c) cooling the heated gas stream from the sulfur removal unit to form a purified carbon dioxide stream; and
   d) removing moisture and other impurities from the purified carbon dioxide stream.

34. A method of removing a sulfur species selected from the group consisting of $H_2S$, COS, dimethyl sulfide and mercaptans from a gas stream comprising:
   a) heating a gas stream to above ambient temperature;
   b) passing the heated gas stream to a sulfur removal unit;
   c) cooling the heated gas stream from the sulfur removal unit to form a purified carbon dioxide stream; and
   d) removing moisture and other impurities from the purified carbon dioxide stream.

35. A method of removing a sulfur species selected from the group consisting of $H_2S$, COS, dimethyl sulfide and mercaptans from a gas stream comprising:
   a) heating a gas stream to about 50° C. to about 150° C.;
   b) passing the heated gas stream to an impurity removal unit;
   c) cooling the heated gas stream from the impurity removal unit to form a purified carbon dioxide stream; and
   d) removing moisture and other impurities from the purified carbon dioxide stream.

* * * * *